United States Patent [19]

Tanaka et al.

[11] Patent Number: 4,893,191
[45] Date of Patent: Jan. 9, 1990

[54] GRADATION CONTROL DEVICE FOR THERMAL INK-TRANSFER TYPE PRINTING APPARATUS

[75] Inventors: Hideshi Tanaka; Kenichi Miyazaki, both of Yokohama, Japan

[73] Assignee: Victor Company of Japan, Ltd., Japan

[21] Appl. No.: 173,989

[22] Filed: Mar. 28, 1988

Related U.S. Application Data

[63] Continuation-in-part of Ser. No. 96,659, Sep. 15, 1987.

[30] Foreign Application Priority Data

Sep. 19, 1986 [JP]  Japan .................................. 61-22163
Mar. 31, 1987 [JP]  Japan .................................. 62-78979

[51] Int. Cl.$^4$ ........................ H04N 1/40; H04N 1/21; H04N 1/23
[52] U.S. Cl. .................................... 358/298; 358/456; 346/76 PH; 400/120

[58] Field of Search ................... 346/76 PH; 358/298, 358/283; 400/120

Primary Examiner—Clifford C. Shaw
Assistant Examiner—Scott A. Rogers
Attorney, Agent, or Firm—Andrus, Sceales, Starke & Sawall

[57] ABSTRACT

A gradation control device for a thermal ink-transfer type printing apparatus controls an applying time of a current to each of heating elements of a thermal printing head depending on a voltage drop caused to a supply voltage to the thermal printing head, so that it is possible to constantly print the same gradation level with the same printing dot size regardless of the printing data. The voltage drop is detected in a vicinity of an end of a current applying duration in which the current is supplied to the heating elements of the thermal printing head.

6 Claims, 11 Drawing Sheets

FIG.7
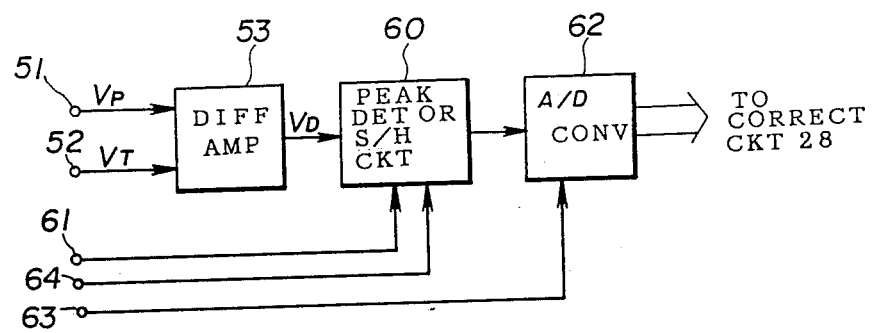
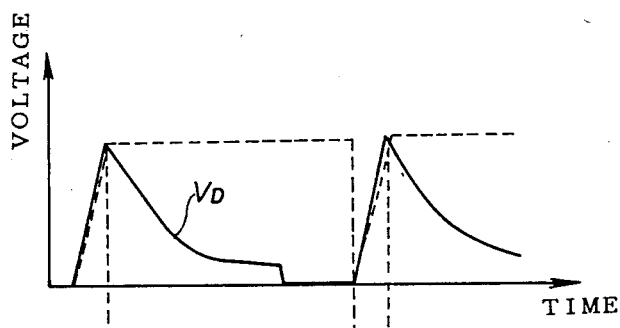
FIG.8A
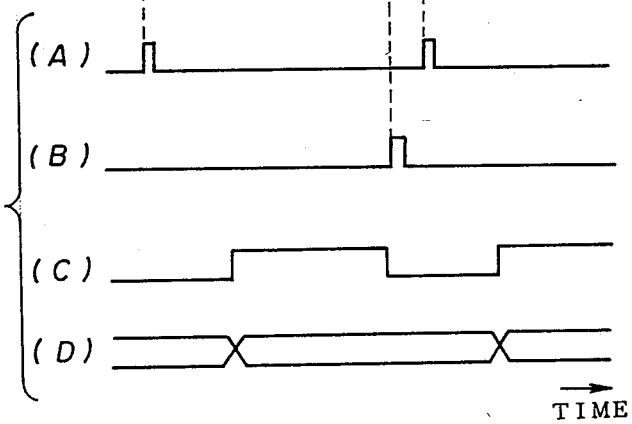
FIG.8B

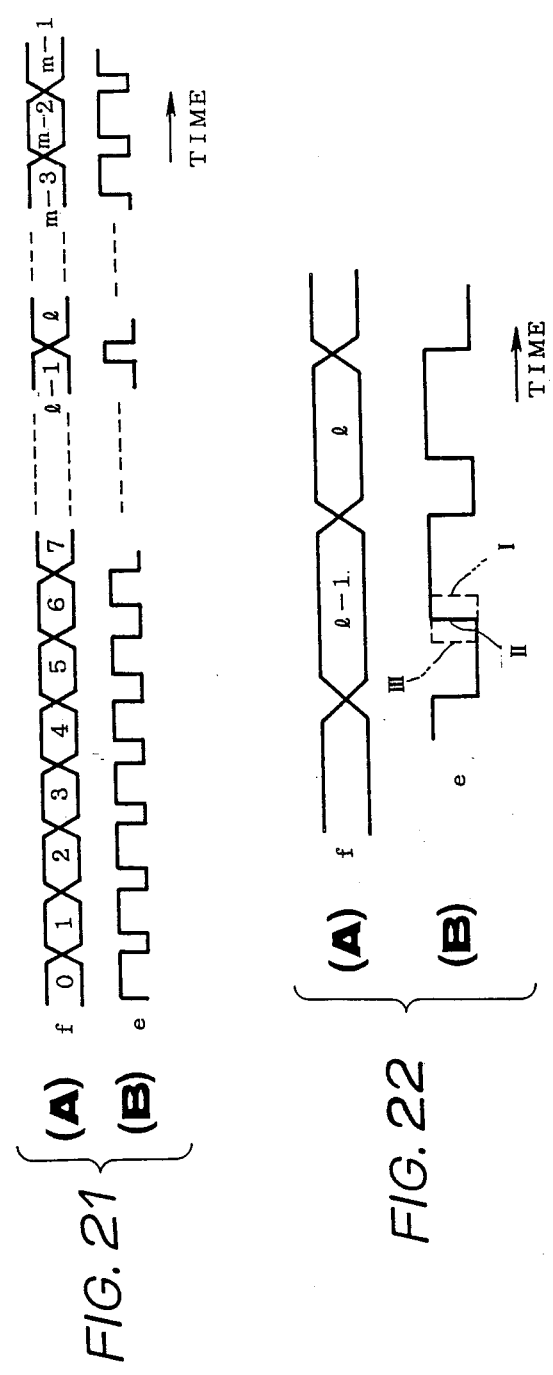

GRADATION CONTROL DEVICE FOR THERMAL-INK-TRANSFER TYPE PRINTING APPARATUS

The present application is a continuation-in-part Application of the U.S. patent application Ser. No. 096,659 filed Sept. 15, 1987.

BACKGROUND OF THE INVENTION

The present invention generally relates to gradation (or density) control devices for thermal ink-transfer type printing apparatuses (hereinafter simply referred to as thermal printers), and more particularly to a gradation control device which controls the size of printing dots by controlling an applying time of a constant current amplitude which is applied to heating elements of a thermal printing head in order to control the gradation level or printing density in a thermal printer.

Among terminal printers or hard-copy apparatuses such as wire-dot type and ink-jet type printers, thermal printers are being developed as one of the more promising type and are used in copying machines, facsimile machines and the like. For example, the thermal printer employs an ink film which is a polyester film having a thickness of 5 to 6 microns coated with a kind of ink which melts due to heat on one surface thereof. The ink film is placed onto a recording sheet with the ink side making contact with the recording sheet, and a thermal printing head makes contact with a rear side of the ink film. When a current flows through the thermal printing head so as to generate heat at the thermal printing head, the ink on the ink film melts at the position corresponding to the position of the thermal printing head, and the melted ink is transferred onto the recording sheet. The thermal printing head comprises a plurality of heating elements arranged in a row, and a current is applied to each of these heating elements which are to be heated.

The density which determines the gradation level of the printed characters, diagrams, pictures and the like, is determined by the area of each dot formed on the recording sheet. And, this area of the melted ink dot is determined according to the current applied to each of the heating elements. Generally, the heat value becomes larger as the amplitude of the current applied to the heating element becomes larger. As a result, the area of the melted ink dot becomes larger to increase the printing density, and the gradation level reaches near a saturated density. Accordingly, the amplitudes of the currents applied to the heating elements are conventionally controlled in order to control the gradation level of the printing. However, the currents applied to the heating elements are generally large currents in the order of 5 to 20 Amperes. Thus, it is difficult to control such large currents with a quick response speed, and there are disadvantages in that the size of the gradation control device becomes large and the gradation control device becomes expensive. Furthermore, it is impossible to increase the response speed when controlling such large currents, and there is a disadvantage in that the printing speed cannot be increased.

Accordingly, an improved tone (gradation) control device for a thermal printer was previously proposed in a U.S. Pat. No. 4,532,523 in which the assignee is the same as the assignee of the present application. This previously proposed tone control device controls the printing density by controlling the size of the printing dots according to durations of currents which are applied to the heating elements of the thermal printing head.

However, even in the case of the previously proposed tone control device, a large current is applied to those heating elements which are to transfer the ink on the ink film onto the recording sheet. For this season, an inevitable voltage drop occurs to power source thus to the supply voltage to the heating elements of the thermal printing head. The number of heating elements to which the current is applied depends on the amount of printing data per given time, and the voltage drop accordingly changes depending on the printing data. As a result, the current flow to the heating elements which should be kept constant undesirably changes, and there is a problem in that the size of the printing dots actually printed on the recording sheet changes depending on the printing data even when the gradation level is attempted to be constant. Similar problems occur when a power source voltage of the power source is unstable and drops due to a poor regulation thereof.

In order to overcome the problem of the voltage drop, it is necessary to use a power source having a large capacity, but it would be impractical to employ such a power source bulky and expensive. It is possible to conceive a method of dividing the heating elements of the thermal printing head into a number of heating element groups, and drive the heatng element groups time-divisionally so as to reduce the peak current which is required at a time and enable the use of a compact power source having a smaller capacity. However, this method is impractical in that a printing error may develop due to time delays in the control of the heating element groups which are actually driven.

On the other hand, as a measure against the voltage drop caused to the supply voltage to the heating elements of the thermal printing head, the power source voltage may be corrected by remote sensing, for example. But the correction of the power source voltage by the remote sensing is insufficient in that the response speed is too slow in the case where the heating elements of the thermal printing head are driven by pulse currents.

SUMMARY OF THE INVENTION

Accordingly, it is a general object of the present invention to provide a novel and useful gradation control device in which the problems described heretofore are eliminated.

Another and more specific object of the present invention is to provide a gradation control device which controls a duration of a current applied to each of heating elements of a thermal printing head depending on a voltage drop caused to a supply voltage to the thermal printing head. According to the gradation control device of the present invention, there is no need to use a power source having a large capacity for the purpose of avoiding such voltage drop caused at the terminal of the thermal printing head. Therefore, it is possible to constantly print the same gradation level with the same printing dot size regardless of the amount of printing data per given time. In addition, the overall size of a thermal printer applied with the gradation control device of the present invention can be reduced because the gradation control device can be made compact.

Still another object of the present invention is to provide a gradation control device for a thermal ink-transfer type printing apparatus, comprising a memory circuit for storing at least n digital data of natural binary code which represent gradation levels with which the printing is to be carried out, a converting circuit including a circuit part for repeatedly reading out the n digital data from the memory circuit in response to a clock pulse signal having a constant repetition frequency k times in a time period in which one line is printed and a circuit part for generating a reference printing density datum a value of which is changed every time the n digital data are read out once, where the converting circuit produces control data in a form of a serial n-bit data signal having a constant bit rate in accordance with the constant repetition frequency every time the n digital data are read out once so that each control datum constituting the serial n-bit data signal has a logic value "1" or "0" depending on whether or not each value of the n digital data is greater than or equal to the value of the reference printing datum, a serial-to-parallel converting circuit for converting the n-bit data signal into a parallel n-bit data signal, a voltage drop detecting circuit for detecting a voltage drop caused to a supply voltage at a terminal of a thermal printing head and for producing a voltage drop datum dependent on the detected voltage drop, a heating pulse generating circuit for generating k heating pulses for printing one line, where the k heating pulses have a constant repetition frequency and pulse durations which are variable as a function of the value of the reference printing density datum and the voltage drop datum, and a driving circuit supplied with the parallel n-bit data signal and the heating pulses for supplying to each of n heating elements of the thermal printing head having a corresponding control datum with the logic value "1" a current having a predetermined amplitude for the durations of the heating pulses. According to the gradation control device of the present invention, the current applying duration to the thermal printing head is controlled automatically depending on the detected voltage drop caused to the supply voltage to the thermal printing head. For this reason, it is possible to constantly print at the same gradation level with the same printing dot size regardless of the amount of printing data per given time. Moreover, the overall size of the thermal ink-transfer type printing apparatus can be reduced because the gradation control device of the present invention can be made compact.

A further object of the present invention is to provide a gradation control device for a thermal ink-transfer type printing apparatus, comprising a memory circuit for storing at least n digital data of natural binary code which represent gradation levels with which the printing is to be carried out, a converting circuit including a circuit part for repeatedly reading out the n digital data from the memory circuit in response to a clock pulse signal having a constant repetition frequency k times in a time period in which one line is printed and a circuit part for generating a reference printing density datum a value of which is changed every time the n digital data are read out once, where the converting circuit produces control data in a form of a serial n-bit data signal having a constant bit rate in accordance with the constant repetition frequency every time the n digital data are read out once so that each control datum constituting the serial n-bit data signal has a logic value "1" or "0" depending on whether or not each value of the n digital data is greater than or equal to the value of the reference printing datum, a serial-to-parallel converting circuit for converting the n-bit data signal into a parallel n-bit data signal, a voltage drop detecting circuit for detecting a voltage drop caused to a supply voltage to a thermal printing head and for producing a voltage drop datum dependent on the detected voltage drop, a heating pulse generating circuit for generating k heating pulses for printing one line, where the k heating pulses respectively have a constant repetition frequency and pulse durations which are variable as a function of the value of the reference printing density datum and the voltage drop datum, and a driving circuit supplied with the parallel n-bit data signal and the heating pulses for supplying to each of n heating elements of the thermal printing head having a corresponding control datum with the logic value "1" a current having a predetermined amplitude for current applying durations corresponding to the durations of the heating pulses. The voltage drop detecting circuit detects the voltage drop in a vicinity of an end of each of the current applying durations. According to the gradation control device of the present invention, the current applying duration to the the thermal printing head is controlled automatically depending on the detected voltage drop. For this reason, it is possible to constantly print the same gradation level with the same printing dot size regardless of the printing data. Moreover, the overall size of the thermal ink-transfer type printing apparatus can be reduced because the gradation control device of the present invention can be made compact. Further, since the head terminal voltage is stable in the vicinity of the end of the current applying duration, the voltage drop data can be obtained with a high stability when the voltage drop is detected in the vicinity of the end of the current applying duration.

Other objects and further features of the present invention will be apparent from the following detailed description when read in conjunction with the accompanying drawings.

BRIEF DESCRIPTION OF THE DRAWINGS

FIG. 7 is a system block diagram showing a second embodiment of the voltage drop detecting circuit of the gradation control device shown in FIG. 1;

FIG. 8A shows a drop voltage obtained within the voltage drop detecting circuit shown in FIG. 7;

FIGS. 8B(A) through 8B(D) are timing charts for explaining the operation of the voltage drop detecting circuit shown in FIG. 7;

FIGS. 10(A) through 10(E), FIGS. 11(A) through 11(C) and FIGS. 12(A) and 12(B) are timing charts for explaining the operation of the correcting circuit shown in FIG. 9;

FIGS. 13(A) and 13(B) are time charts for explaining the correction of the current applying duration carried out in the gradation control device of the present invention;

FIGS. 19(A) through 19(E), FIGS. 20(A) through 20(C) and FIGS. 21(A) and 21(B) are timing charts for explaining the operation of the correcting circuit shown in FIG. 18; and FIGS. 22(A) and 22(B) are timing charts for explaining the correction of the current applying duration carried out in the gradation control device of the present invention.

DETAILED DESCRIPTION

Figure 1:
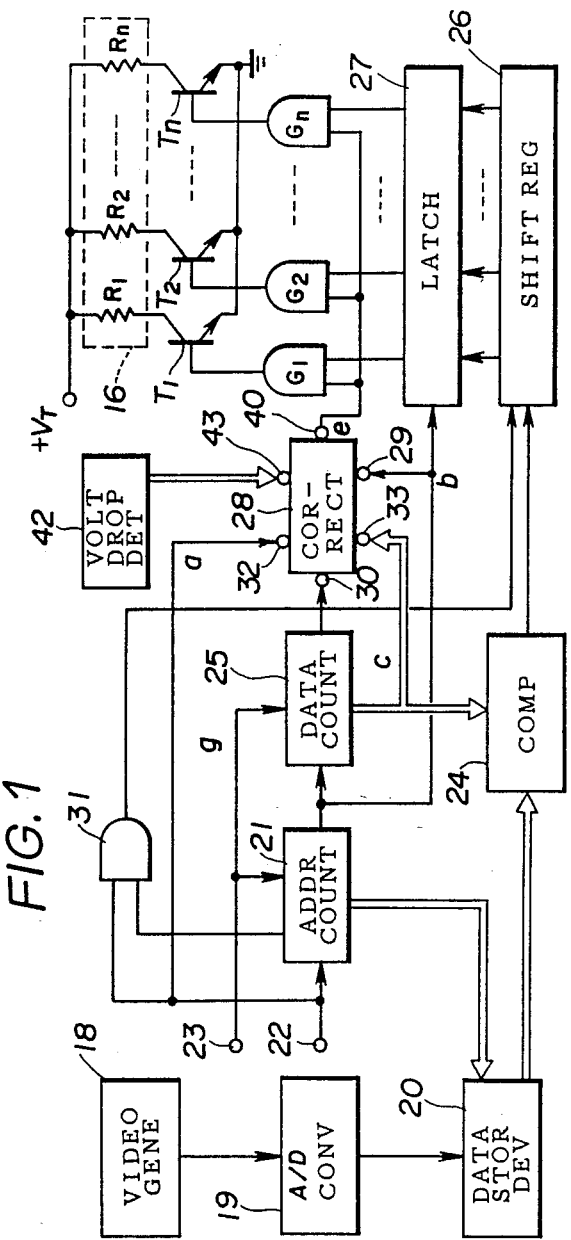
FIG. 1 is a system block diagram showing an embodiment of the gradation control device according to the present invention.

FIG. 1 shows an embodiment of the gradation control device according to the present invention. In FIG. 1, a thermal printing head 16 comprises a ceramic substrate and n heating elements (heating resistors) R1 through Rn provided on the substrate, where n is an integer greater than or equal to two. The printing head 16 is positioned on an ink film 11 shown in FIG. 2, and the n heating elements R1 through Rn are arranged in-line in a width direction of the ink fill 11.

Figure 2:
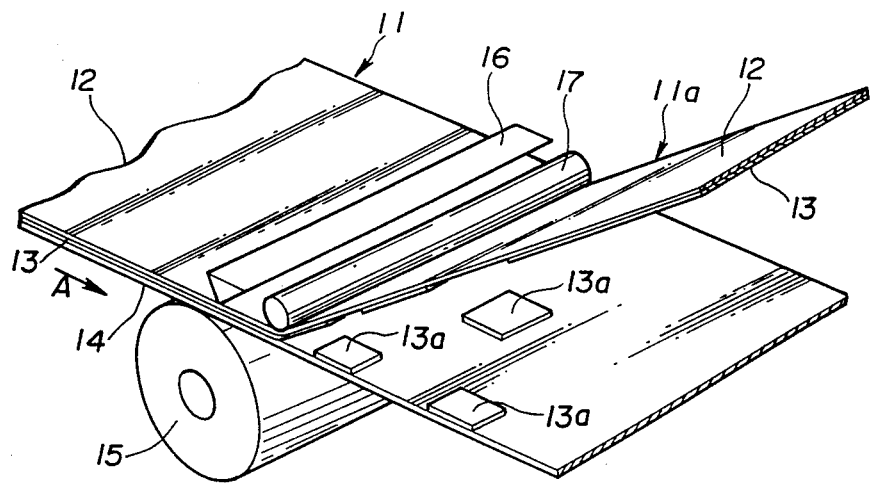
FIG. 2 is a perspective view generally showing an essential part of a thermal printer which may be applied with the gradation control device according to the present invention.

The gradation control device according to the present invention may be applied to a thermal printer having a known construction shown in FIG. 2. In FIG. 2, the ink film 11, acting as a transfer sheet, comprises a polyester film 12 and an ink 13 of a kind which melts due to heat coated over one surface of the polyester film 12 to a predetermined thickness. A recording sheet 14 makes contact with the side of the ink film 11 coated with the ink 13, and is fed along a direction A by a roller 15 together with the ink film 11. The printing head 16 is provided opposing the roller 15, and made contact with the back side of the ink film 11, that is, the side of the ink film 11 not coated with the ink 13.

Parts of the ink 13 on the ink film 11 corresponding to positions of the heating elements which are applied with a current out of the heating elements R1 through Rn constituting the printing head 16, melt and are transferred onto the recording sheet 14. After the ink film 11 passes by the printing head 16, the ink film 11 is guided by a roller 17, separated from the recording sheet 14 and then taken up on a take-up spool (not shown) as a used ink film 11a. A transferred ink 13a remains on a printed surface 14a of the printed recording sheet 14. The area of the transferred ink 13a is shown as a large area in FIG. 2 for convenience' sake, however, the transferred ink 13a actually is a collection of small dots.

One dot is formed by one heating element, and the size of one dot is determined by the amplitude of the current applied to a corresponding one of the heating elements R1 through Rn or an applying time (duration) during which a constant amplitude of current is applied to the corresponding heating element. The density of the printed figures and the like, that is, the gradation level, is determined by the size of each of the dots i.e. a higher the amplitude or a longer the duration, the denser dot.

The gradation control device according to the present invention may be applied to such a thermal printer of the type described above. Returning to the description of FIG. 1, an analog video signal from a video signal generator 18 is converted into a digital signal in an analog-to-ditital (A/D) converter 19, and the digital signal is stored in a data storing device 20. On the other hand, an address counter 21 is supplied with a reference clock pulse signal from a terminal 22 and a start pulse signal from a terminal 23, and supplies an address to the data storing device 20. A data counter 25 outputs a reference printing density datum (that is, a datum of a reference gradation level, and hereinafter referred to as a second datum) which successively changes from "0" which indicates a minimum printing density to "m−1" which indicates a maximum printing density, where m denotes the number of output second data of the data counter 25.

A density data comparing circuit 24 compares the value of the second datum and the values of n first data intended for the n heating elements R1 through Rn, for each of the m printing densities. An n-bit datum obtained as a result of the comparison with one second datum is passed through a shift register 26 and is latched in a latch circuit 27. Hence, data (control data) obtained by the comparison of each of the m second data and the n first data corresponding to one printing line are successively latched in the latch circuit 27 a total of m times.

The data storing device 20 supplies to the comparing circuit 24 one first datum (a first datum in the data obtained from the A/D converter 19) corresponding to a first address from the address counter 21. Initially, a count in the data counter 25 is set to "0" because the data counter 25 is reset by the start pulse signal from the terminal 23. The reference printing density datum (second datum) which is successively incremented according to the count is supplied to the comparing circuit 24 from the data counter 25. The comparing circuit 24 compares the first datum and the second datum "0" which indicates the minimum printing density, and supplies a control datum "1" when the first datum is greater than the second datum "0" and supplies a control datum "0" when the first datum is smaller than or equal to the second datum "0".

When the processing with respect to the first address is completed, the address counter 21 successively supplies the second, third, . . . , and n-th addresses to the data storing device 20, and the data storing device 20 successively supplies to the comparing circuit 24 the first data corresponding to the second through n-th addresses. The first data corresponding to the first through n-th addresses respectively are the picture element data which are to be printed by the heating elements Rl through Rn. The comparing circuit 24 compares the second datum "0" and the first data corresponding to the second through n-th addresses, and successively supplies a control datum "0" or "1" to the shift register 26 depending on the compared results. The n-bit control datum from the comparing circuit 24 corresponding to the first through n-th addresses are entered into the n-stage shift register 26 by being successively shifted therein in synchronism with the reference clock pulse signal which is obtained from the terminal 22 via an AND circuit 31.

When the address counter 21 finishes counting n clock pulses and accordingly finishes outputting the first through n-th addresses, the address counter 21 supplies a data transfer pulse to the data counter 25 and the latch circuit 27. Furthermore, this data transfer pulse is also supplied to a correcting circuit 28 via a terminal 29. The correcting circuit 28 receives the reference clock pulse signal from the terminal 22 through a terminal 32. The data counter 25 supplies a heating time limiting pulse to the correcting circuit 28 via a terminal 30 responsive to the data transfer pulse. In addition, the data counter 21 increments the value "0" of the second datum to a value "1" which indicates the next smallest printing density to the printing density indicated by the initial value "0".

The n-bit control datum which is entered into the shift register 26 is latched in parallel by the latch circuit 27 responsive to the data transfer pulse. The n-bit control datum latched by the latch circuit 27 is supplied in parallel to one of two input terminals of gate (AND) circuits G1 through Gn.

Next, the address counter 21 resets itself by loading data "00 ... 0" in response to a load pulse signal generated therein responsive to a carry signal when the count in the address counter 21 exceeds the value corresponding to the n-th address. Thus, the address counter 21 again successively outputs the first through n-th addresses so that the data storing device 20 outputs n first data and these n first data are compared with the second datum "1" in the comparing circuit 24. In this case where the second datum is "1", the data counter 25, the shift register 26, the latch circuit 27, the AND circuit 31 and the like operate similarly as in the case where the second datum is "0" as described before. Hence, latched control datum is supplied to the gate circuits G1 through Gn.

A corrected heating pulse from a terminal 40 of the correcting circuit 28 is applied to the other of the two input terminals of each of the gate circuits G1 through Gn. Output signals of the gate circuits G1 through Gn are applied to bases of corresponding NPN-type transistors T1 through Tn and controls the switching thereof. A current is applied to those heating elements which are coupled to collectors of the transistors which are turned ON, and the heating elements applied with the current are heated.

A voltage drop detecting circuit 42 detects a voltage drop developed at a terminal of the printing head 16 and supplies a detected voltage drop datum to a terminal 43 of the correcting circuit 28. Hence, a corrected heating pulse dependent on the detected voltage drop is outputted from the terminal 40 of the correcting circuit 28.

Similarly thereafter, the comparison in the comparing circuit 24 is carried out for the first through n-th addresses with respect to all of the remaining printing densities indicated by values "2" through "m−1" in the data counter 25.

Figure 3:
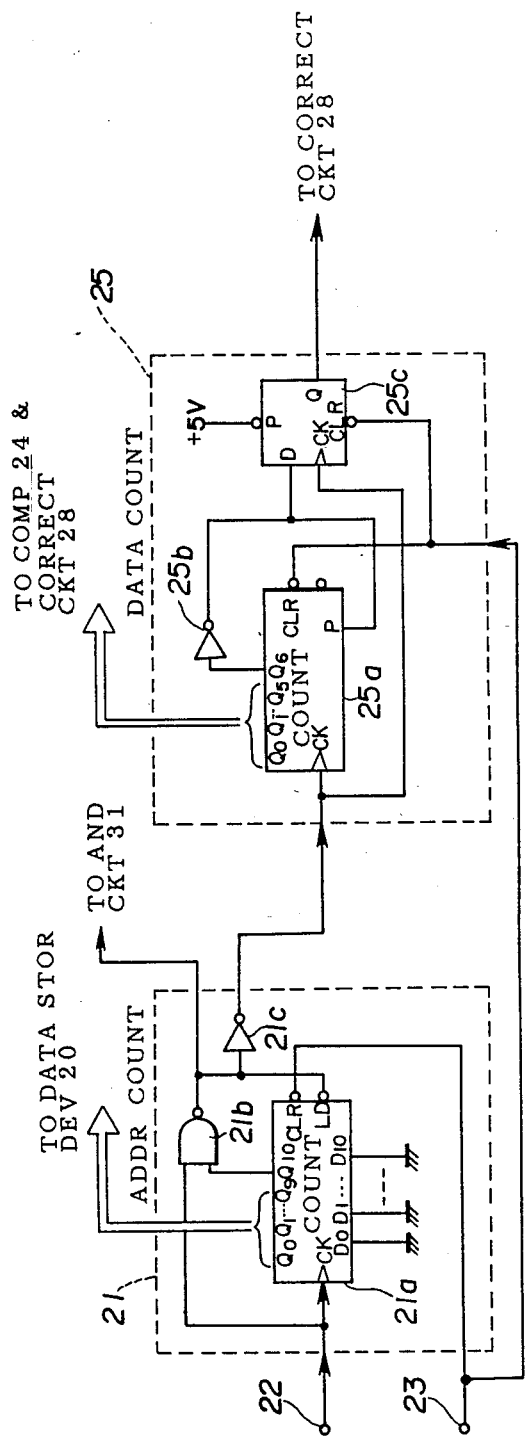
FIG. 3 is a system circuit diagram showing an embodiment of an address counter and a data counter of the gradation control device shown in FIG. 1.

FIG. 3 shows an embodiment of the address counter 21 and the data counter 25. The address counter 21 comprises a counter 21a, a 2-input NAND circuit 21b and an inverter 21c. The data counter 25 comprises a counter 25a, an inverter 25b and a flip-flop 25c. The reference clock pulse signal from the terminal 22 is supplied to a clock terminal CK of the counter 21a and one input terminal of the NAND circuit 21b. The start pulse signal from the terminal 23 is supplied to clear terminals CLR of the counters 21a and 25a and the flip-flop 25c. Outputs from terminals Q0 through Q9 of the counter 21a are supplied to the data storing device 20, and an output (carry signal) from a terminal Q10 is supplied to the other input terminal of the NAND circuit 21b. An output of the NAND circuit 21b is supplied to a load terminal LD of the counter 21a, the inverter 21c and the AND circuit 31. The counter 21a loads the data "00 ... 0" responsive to a low-level load pulse signal applied to the load terminal LD thereof. An output of the inverter 21c is supplied to clock terminals CK of the counter 25a and the flip-flop 25c. Outputs from terminals Q0 through Q5 of the counter 25a are supplied to the comparing circuit 24 and the correcting circuit 28. An output (carry signal) from a terminal Q6 of the counter 25a is passed through the inverter 25b and is supplied to a terminal P of the counter 25a and a data terminal D of the flip-flop 25c. The counter 25a holds the count when a low-level signal is supplied to the terminal P thereof and keeps this count regardless of the signal applied to the clock terminal CK of the counter 25a. A fixed voltage (+5 V) is applied to a preset terminal P of the flip-flop 25c, and a Q-output of the flip-flop 25c is supplied to the correcting circuit 28 as the heating time limiting pulse.

Figure 4:
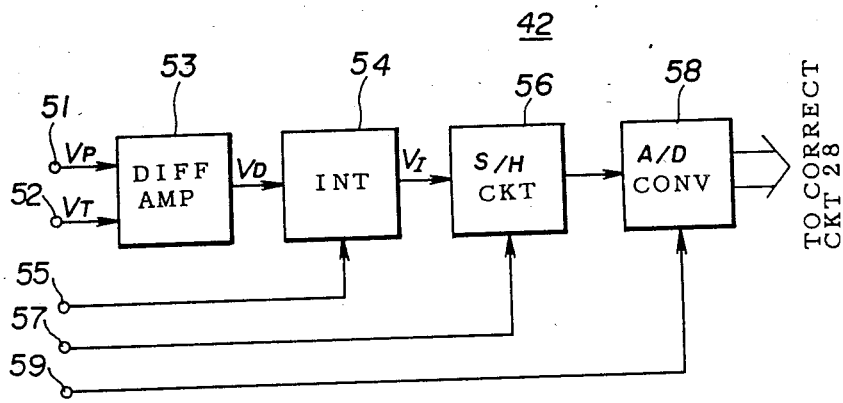
FIG. 4 is a system block diagram showing a first embodiment of a voltage drop detecting circuit of the gradation control device shown in FIG. 1.

The present embodiment is characterized in that corrected heating pulse is outputted from the correcting circuit 28 depending on the output voltage drop datum of the voltage drop detecting circuit 42 shown in FIG. 1. Hence, description will now be given with respect to an embodiment of the voltage drop detecting circuit 42 by referring to FIG. 4. In FIG. 4, the voltage drop detecting circuit 42 comprises a differential amplifier 53, an integrating circuit 54, a sample and hold (S/H) circuit 56, and an analog-to-digital (A/D) converter 58.

A reference voltage $V_P$ and a head terminal voltage $V_T$ are applied to respective terminals 51 and 52 and are supplied to the differential amplifier 53. The reference voltage $V_P$ is a constant voltage and is obtained from a fixed voltage source (not shown) or by holding the power source voltage for the printing head 16 during a non-printing interval. As will be described later, the voltage drop developed at the terminal of the printing head 16 can be detected by simply supplying the head terminal voltage $V_T$ to the terminal 52.

Figure 5:
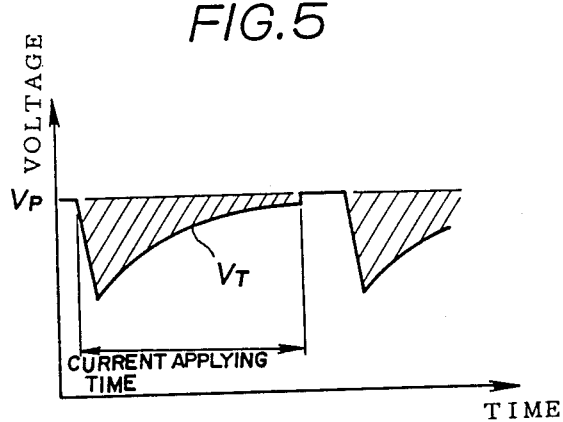
FIG. 5 shows a reference voltage and a head terminal voltage applied to the voltage drop detecting circuit shown in FIG. 4.

The head terminal voltage $V_T$ varies depending on the printing data as shown in FIG. 5. Accordingly, a voltage drop occurs between the reference voltage $V_P$ and the head terminal voltage $V_T$ as indicated by hatchings in FIG. 5 when the current is applied to the printing head. In FIG. 5, the current applying duration corresponds to the pulse width of the heating time limiting pulse.

Figure 6A:
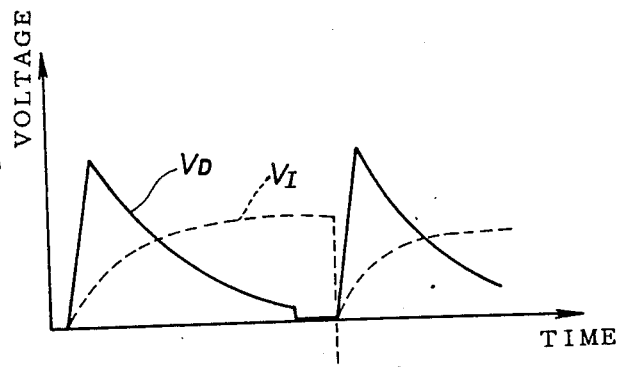
FIG. 6A shows a drop voltage obtained within the voltage drop detecting circuit shown in FIG. 4.

The differential amplifier 53 amplifies a voltage difference between the reference voltage $V_P$ and the head terminal voltage $V_T$, and supplies to the integrating circuit 54 a drop voltage $V_D$ shown in FIG. 6A corresponding to the voltage drop between the reference voltage $V_P$ and the voltage at the terminal of the printing head 16. The integrating circuit 54 is supplied with a reset signal from a terminal 55, and this reset signal shown in FIG. 6B(A) has a period amounting to the time it takes to print one line with one density (one gradation level). For example, the period of this reset signal is in the range of 15 μsec to 100 μsec. Accordingly, the integrating circuit 54 integrates the drop voltage $V_D$ for every one period of the reset signal, and produces a voltage $V_I$ indicated by phantom lines in FIG. 6A. This voltage $V_I$ corresponds to the accumulated voltage drop within the current applying duration, that is, the pulse width of the heating time limiting pulse. The voltage $V_I$ from the integrating circuit 54 is supplied to the S/H circuit 56.

Figure 6B:
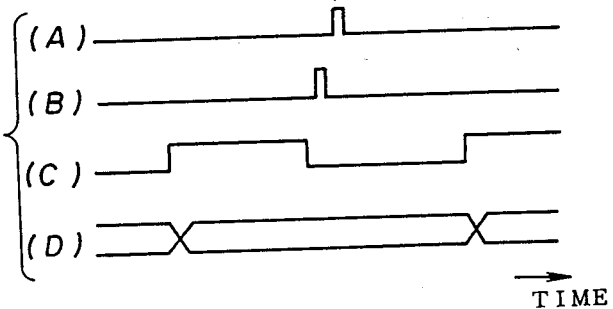
FIGS. 6B(A) through 6B(D) are timing charts for explaining the operation of the voltage drop detecting circuit shown in FIG. 4.

A sampling pulse signal shown in FIG. 6B(B) having a period amounting to the time it takes to print one line with one density is applied to a terminal 57 and is supplied to the S/H circuit 56. This sampling pulse signal has such a timing that the sampling is carried out in the S/H circuit 56 when the voltage change stabilizes, that is, when the voltage $V_I$ becomes approximately constant. As a result, the S/H circuit 56 samples the incoming voltage $V_I$ responsive to the sampling pulse signal and holds the sampled voltage until the next sampling point, that is, for the time it takes to print one line with one density. The output sampled voltage of the S/H circuit 56 is supplied to the A/D converter 58.

A clock signal shown in FIG. 6B(C) is applied to a terminal 59 and is supplied to the A/D converter 58, and the A/D converter 58 converts the sampled voltage into a digital voltage drop datum shown in FIG. 6B(D) responsive to the clock signal.

FIG. 7 shows a second embodiment of the voltage drop detecting circuit 42. In FIG. 7, those parts which are the same as those corresponding parts in FIG. 4 are designated by the same reference numerals, and a description thereof will be omitted. The voltage drop detecting circuit 42 shown in FIG. 7 comprises the differential amplifier 53, a circuit 60, and an A/D converter 62. The circuit 60 may either be a peak detecting circuit or a sample and hold (S/H) circuit.

The differential amplifier 53 generates a drop voltage $V_D$ shown in FIG. 8A from the reference voltage $V_P$ and the head terminal voltage $V_T$. In the case where the circuit 60 is a S/H circuit, the S/H circuit 60 detects the peak voltage of the drop voltage $V_D$ based on a sampling pulse signal shown in FIG. 8B(A) which is obtained from a terminal 61, and supplies to the A/D converter 62 the sampled voltage indicated by phantom lines in FIG. 8A. The sampling pulse signal has a period amounting to the time it takes to print one line with one density. On the other hand, in the case where the circuit 60 is a peak detecting circuit, the peak detecting circuit 60 has no need of the pulse signal from the terminal 61 and detects the peak voltage of the drop voltage $V_D$, and the peak voltage indicated by the phantom lines in FIG. 8A is supplied to the A/D converter 62. In either case where the circuit 60 is the S/H circuit or the peak detecting circuit, the circuit 60 is reset by a reset signal shown in FIG. 8B(B) which is obtained from a terminal 64.

The A/D converter 62 converts the sampled voltage or the peak voltage from the circuit 60 into a digital voltage drop datum responsive to a clock signal shown in FIG. 8B(C) which is obtained from a terminal 63. As a result, the digital voltage drop datum shown in FIG. 8B(D) is supplied to the correcting circuit 28.

The circuit construction of the second embodiment of the voltage drop detecting circuit 42 shown in FIG. 7 is simple compared to that of the first embodiment shown in FIG. 4, because no integrating circuit is required in the second embodiment. However, the sampled or peak value of the drop voltage $V_D$ successively changes with time depending on the external conditions, stray capacitance of the wires and the like. For this reason, the first embodiment of the voltage drop detecting circuit 42 is a more desirable embodiment in that the voltage drop datum is obtained by integrating the drop voltage $V_D$, and the stability of the first embodiment is high compared to that of the second embodiment.

Figure 9:
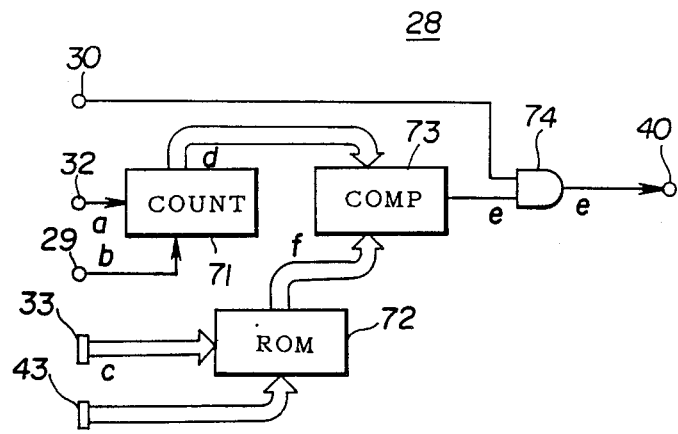
FIG. 9 is a system block diagram showing an embodiment of a correcting circuit of the gradation control device shown in FIG. 1.

Next, a description will be given on an embodiment of the correcting circuit 28 by referring to FIG. 9. In FIG. 9, those parts which are the same as those corresponding parts in FIG. 1 are designated by the same reference numerals. In FIG. 9, the correcting circuit 28 comprises a counter 71, a read only memory (ROM) 72, a comparator 73 and a 2-input AND circuit 74. The reference printing density datum (second datum) c shown in FIG. 10(C) from the data counter 25 shown in FIG. 1 is supplied to the ROM 72 through the terminal 33 and the output voltage drop datum of the voltage drop detecting circuit 42 shown in FIG. 1 is supplied to the ROM 72 through the terminal 43, respectively as read-out address data. As a result, a correcting datum f shown in FIG. 12(A) is read out from the ROM 72 based on the read-out address data.

The ROM 72 pre-stores a set of correcting data amounting to the maximum number m of gradation levels, at addresses designated by each of the voltage drop data. For example, when the gradation is described in 6 bits and the voltage drop datum is described in 4 bits, the ROM 72 pre-stores 16 sets of correcting data, where each set of correcting data is made up of 64 correcting data. As will be described later, the correcting data determine the pulse width as a corrected heating pulse. In order to make the change in the printing density among each of the gradation levels approximately linear or to approximate a predetermined curve, the correcting data corresponding to an intermediate gradation level is set to a value smaller than those of the correcting data corresponding to the high and low (dark and light) gradation levels in each set of correcting data. Out of the correcting data which are to be designated by each of the gradation levels (reference density data), the correcting data corresponding to the voltage drop data indicative of larger voltage drops have larger values so as to satisfactorily correct the voltage drop in the power source voltage supplied to the printing head 16.

It is desirable that the correcting data are described in a number of bits approximately the same as the number of bits used to describe the gradation levels.

Figure 10:
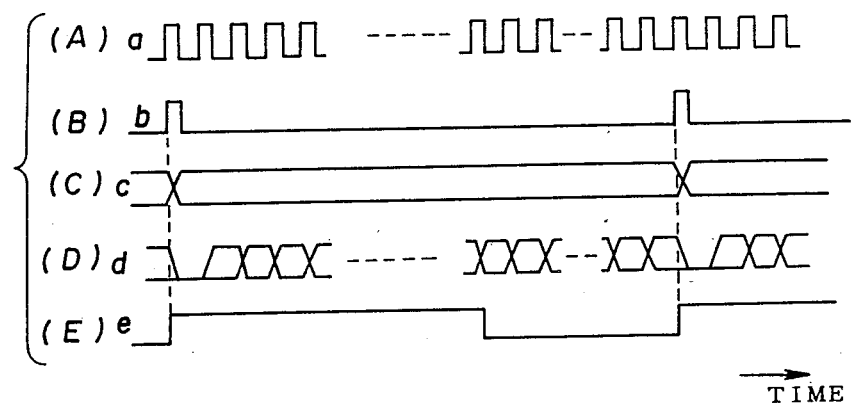

The counter 71 is supplied with a clock pulse signal a shown in FIG. 10(A) which is obtained by dividing the reference clock pulse signal from the terminal 22 shown in FIG. 1 through the terminal 32 and the data transfer pulse b shown in FIG. 10(B) which is obtained from the address counter 21 shown in FIG. 1 through the terminal 29. The counter 71 generates a comparison datum d shown in FIG. 10(D) which is successively incremented starting from "0", for example, every time the transfer pulse b is received. The comparison datum d is reset to "0" when the next transfer pulse b is received. This comparison datum d is supplied to the comparator 73 which is also supplied with the correcting datum f from the ROM 72, and the comparator 73 compares the two data d and f.

Figure 11:
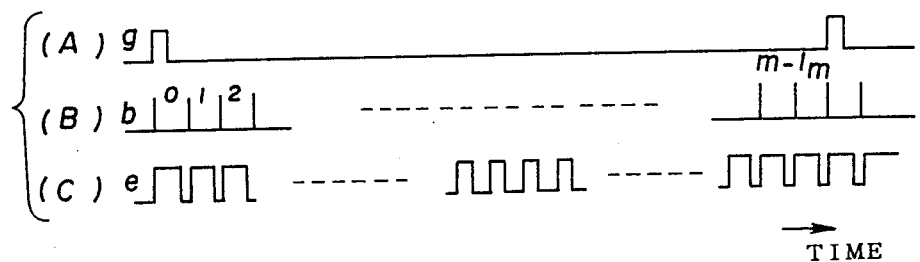

The comparator 73 compares the values of the correcting datum f and the comparison datum d for every period of the data transfer pulse b shown in FIGS. 10(B) and 11(B), and outputs a pulse signal e shown in FIGS. 10(E), 11(C) and 12(B). The pulse signal e has a high level when the value of the comparison datum d is smaller than the value of the correcting datum f, and has a low level when the value of the comparison datum d is greater than or equal to the value of the correcting datum f. Accordingly, the pulse width of the pulse signal e is proportional to the value of the correcting datum f read out from the ROM 72.

The AND circuit 74 is supplied with the pulse signal e from the comparator 73 and the output heating time limiting pulse of the data counter 25 obtained through the terminal 30. But since the heating time limiting pulse has a high level essentially for the entire duration of the printing of the dot, the pulse signal e is passed through the AND circuit 74 and is supplied to the gate circuits Gl through Gn through the terminal 40 as the corrected heating pulse.

Therefore, predetermined heating elements out of the heating elements Rl through Rn are applied with the current depending on the printing data for the applying time which changes depending on the printing density of the picture element data constituting the printing data. Every time the data counter 25 counts the maximum number m of gradation levels, the printing of one line on the recording sheet 14 is completed. When the printing of one line on the recording sheet 14 is completed, the start pulse signal g shown in FIG. 11(A) from the terminal 23 clears the data counter 25, and the data counter 25 again starts to count from "0" to "m−1".

FIGS. 13(A) and 13(B) are time charts for explaining the correction of the current applying duration according to the voltage drop datum. A percentage of the number of heating elements applied with the current with respect to the total number n of the heating elements Rl through Rn will hereunder be defined as a percentage of conducting heads for convenience' sake. FIG. 13(A) shows the correcting datum f readout from the ROM 72, and FIG. 13(B) shows the pulse signal e outputted from the AND circuit 74. In FIG. 13(B), a corrected pulse width of the pulse signal e for a low percentage of conducting heads (for example, 1%) is denoted by I, a corrected pulse width of the pulse signal e for an average percentage of conducting heads (for example, 50%) is denoted by II, and a corrected pulse width of the pulse signal e for a high percentage of conducting heads (for example, 100%) is denoted by III.

As may be seen from FIG. 13(B), the pulse width of the pulse signal e is corrected at a falling edge thereof so that the pulse width becomes large when the percentage of conducting heads is high and the voltage drop between the power source and the printing head 16 is large. Hence, it is possible to control the current applying duration to each of the heating elements of the printing head 16 so that the density of the actually printed dot is the same for each gradation level regardless of the voltage drop between the power source and the printing head 16. On the other hand, the width of the pulse signal e is corrected so that the pulse width becomes small when the percentage of conducting heads is low and the voltage drop between the power source and the printing head 16 is small. Accordingly, it is possible to control the current applying duration to each of the heating elements of the printing head 16 so that the heating elements will not be heated in excess and the density of the actually printed dot is the same for each gradation level regardless of the voltage drop between the power source and the printing head 16.

Figure 14:
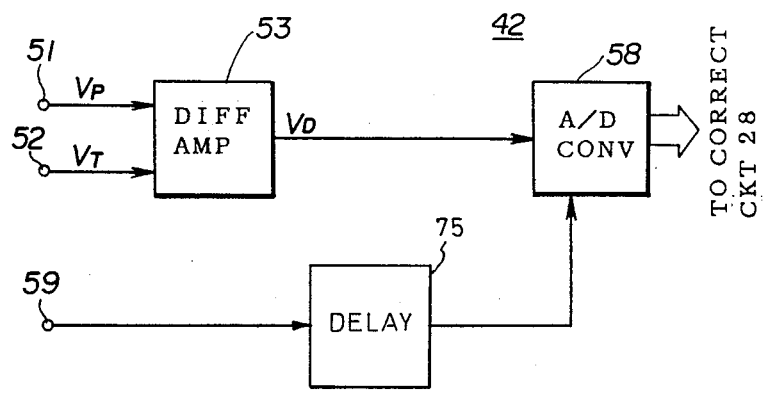
FIG. 14 is a system block diagram showing a third embodiment of the voltage drop detecting circuit of the gradation control device shown in FIG. 1.

Next, a description will be given with respect to a third embodiment of the voltage drop detecting circuit 42 by referring to FIG. 14. In FIG. 14, those parts which are essentially the same as those corresponding parts in FIG. 4 are designated by the same reference numerals, and a description thereof will be omitted.

Figure 15:
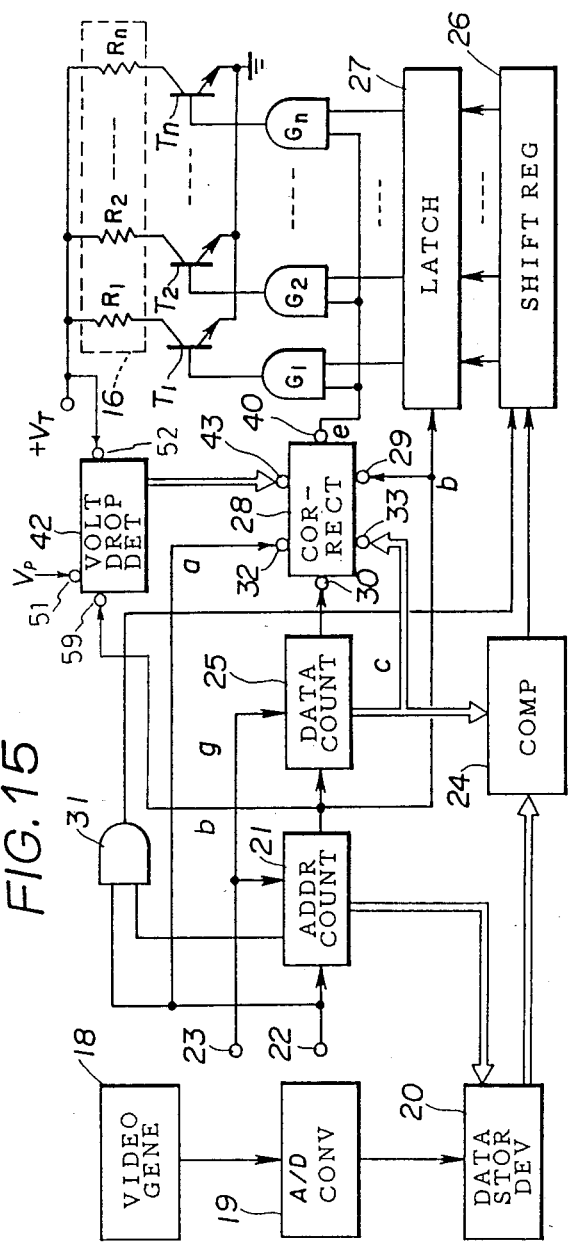
FIG. 15 is a system block diagram showing another embodiment of the gradation control device according to the present invention which may be applied with the voltage drop detecting circuit shown in FIG. 4.

FIG. 15 shows another embodiment of the gradation control device according to the present invention to which the third embodiment of the voltage drop detecting circuit 42 may be applied. In FIG. 15, those parts which are basically the same as those corresponding parts in FIG. 1 are designated by the same reference numerals, and a description thereof will be omitted.

In FIG. 14, the voltage drop detecting circuit 42 comprises the differential amplifier 53, the A/D converter 58 and a delay circuit 75. The reference voltage $V_P$ and the head terminal voltage $V_T$ are applied to the respective terminals 51 and 52 and are supplied to the differential amplifier 53. The reference voltage $V_P$ is a constant voltage and is obtained from a fixed voltage source (not shown) or by holding the power source voltage for the printing head 16 during a non-printing interval. The voltage drop caused at the terminal of the printing head 16 can be detected by simply supplying the head terminal voltage $V_T$ to the terminal 52.

Figure 16:
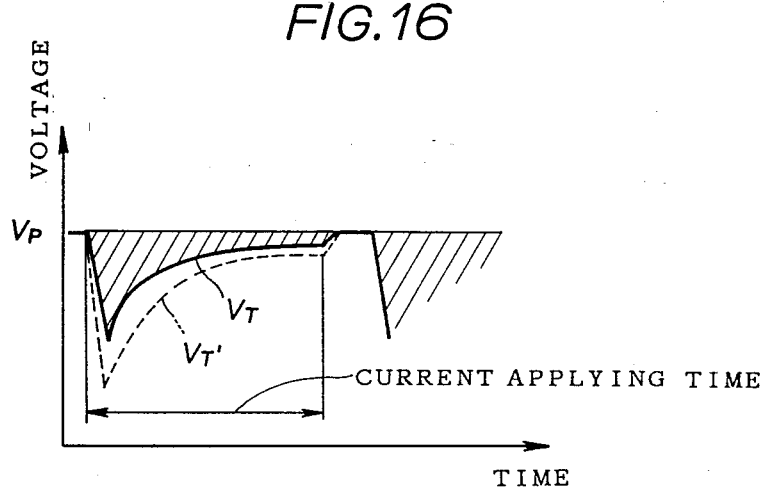
FIG. 16 shows a reference voltage and a head terminal voltage applied to the voltage drop detecting circuit shown in FIG. 14.

The head terminal voltage $V_T$ varies depending on the printing data as shown in FIG. 16. Accordingly, a voltage drop occurs between the reference voltage $V_P$ and the head terminal voltage $V_T$ as indicated by hatchings in FIG. 16 when the current is applied to the printing head 16. In FIG. 16, the current applying duration corresponds to the pulse width of the heating time limiting pulse. Furthermore, when the number of dots to be printed is large and the current is applied to a large number of heating elements, the head terminal voltage becomes as indicated by a phantom line $V_T'$ in FIG. 16, and the voltage drop between the reference voltage $V_P$ and this head terminal voltage $V_T'$ becomes even larger.

Figure 17A:
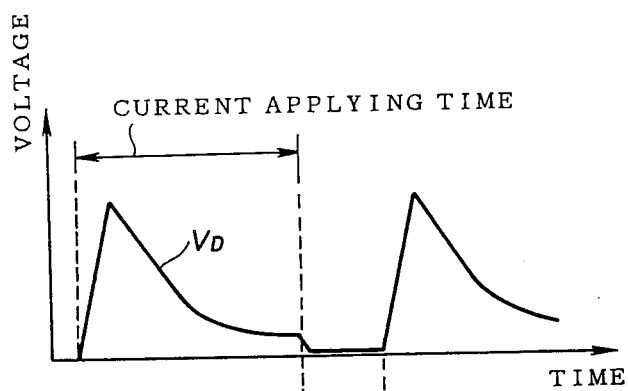
FIG. 17A shows a voltage drop obtained within the voltage drop detecting circuit shown in FIG. 14.

The differential amplifier 53 amplifies a voltage difference between the reference voltage $V_P$ and the head terminal voltage $V_T$, and supplies to the A/D converter 58 a drop voltage $V_D$ shown in FIG. 17A. The A/D converter 58 converts the incoming drop voltage $V_D$ into voltage drop data shown in FIG. 17B(C). The timing with which the A/D converter 58 converts the drop voltage $V_D$ into the voltage drop data is set in a vicinity of an end of the current applying duration. This is done by supplying the data transfer pulse b from the address counter 21 to the terminal 59 as a clock pulse, which is in turn delayed by the delay circuit 75, so that the conversion timing is controlled to be the vicinity of the end of the current applying duration subsequent to the data transfer pulse b. In order to have an optimum voltage drop detecting period during which the A/D converter operates to output the voltage drop data, a one-shot multivibrator (not shown) may be used to produce an optimum pulse duration of the delayed data transfer pulse b, so that the A/D converter 58 operates long enough to cover the end portion of the current applying duration, yet not to cover the starting portion of the following current applying duration.

As an optional circuit design of the gradation control devices, the delay circuit 75 may be omitted so that the A/D converter 58 starts to operate concurrently with the end of the current applying duration responding to the data transfer pulse b which is not delayed. In this case, the voltage drop detection is performed not on the subsequent current applying duration with respect to the non-delayed data transfer pulse b, but is performed on the current applying duration which terminates concurrently with the non-delayed data transfer pulse b. In addition, the voltage detection takes place immediately after the termination of the current applying duration, however, due to a time constant of the power source and associated circuits thereto, the head terminal voltage $V_T$ does not recover instantly but gradually to the reference voltage $V_P$ as shown in FIG. 16. This slow recovery of the head terminal voltage $V_T$ gives the voltage drop detecting circuit 42 enough time to detect a fairly accurate voltage drop related to the voltage drop at the end of the current applying duration. Further, a possible error if any can be corrected by adjusting the correcting data to be pre-stored in the ROM 72.

Figure 17B:
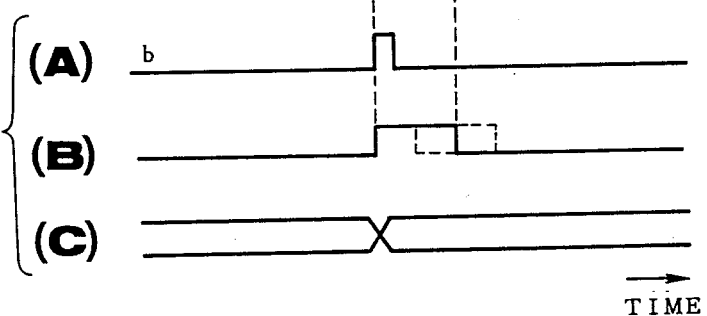
FIGS. 17B(A) through 17B(C) are timing charts for explaining the operation of the voltage drop detecting circuit shown in FIG. 14.

Because the head terminal voltage $V_T$ is stable in the vicinity of the end of the current applying duration, it is possible to obtain the voltage drop data which is sufficiently stable from the practical point of view by carrying out the conversion with the above described timing, even without the circuit part of the embodiments described before which integrates the peak value of the drop voltage $V_D$ and samples the integrated value. In other words, the integrating circuit 54 and the S/H circuit 56 shown in FIG. 4 and the circuit 60 shown in FIG. 7 may be omitted in the present embodiment. FIG. 17B(A) shows a data transfer pulse b which will be described later. As may be seen from FIGS. 17A, 17B(A) and 17B(B), the data transfer pulse b and the clock signal rise at the same time in the vicinity of the end of the current applying duration. The clock signal shown in FIG. 17B(B) essentially has the same timing as a pulse signal e shown in FIGS. 19(E), 20(C) and 21(A) which will be described later.

Figure 18:
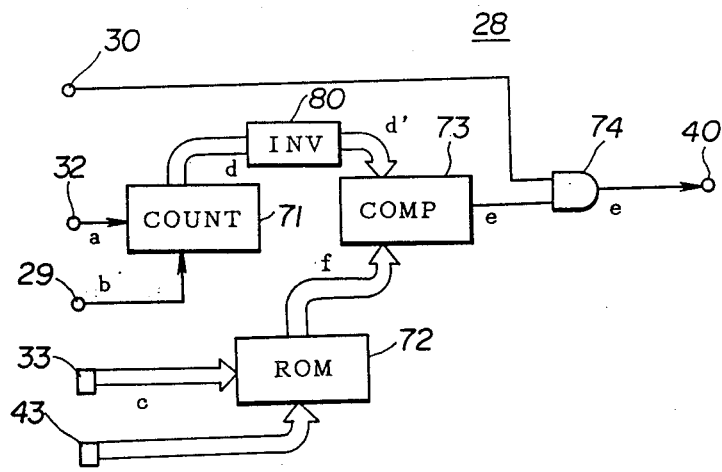
FIG. 18 is a system block diagram showing another embodiment of the correcting circuit of the gradation control device shown in FIG. 15.

Next, a description will be given on another embodiment of the correcting circuit 28 which may be used together with the third embodiment of the voltage drop detecting circuit 42 shown in FIG. 14, by referring to FIG. 18. In FIG. 18, those parts which are essentially the same as those corresponding parts in FIG. 9 are designated by the same reference numerals. In FIG. 8, the correcting circuit 28 comprises the counter 71, the read only memory (ROM) 72, the comparator 73, the 2-input AND circuit 74 and an inverter 80. The reference printing density datum (second datum) c shown in FIG. 19(C) from the data counter 25 shown in FIG. 15 is supplied to the ROM 72 through the terminal 33 and the output voltage drop datum of the voltage drop detecting circuit 42 shown in FIG. 15 is supplied to the ROM 72 through the terminal 43, respectively as readout address data. As a result, a correcting datum f shown in FIG. 21(A) is read out from the ROM 72 based on the read-out address data.

The ROM 72 pre-stores a set of correcting data amounting to the maximum number m of gradation levels, at addresses designated by each of the voltage drop data. For example, when the gradation is described in 6 bits and the voltage drop datum is described in 4 bits, the ROM 72 pre-stores 16 sets of correcting data, where each set of correcting data is made up of 64 correcting data. As will be described later, the correcting data determine the pulse width of the corrected heating pulse. In order to make the change in the printing density among each of the gradation levels approximately linear or to approximate a predetermined curve, the correcting data corresponding to an intermediate gradation level is set to a value smaller than those of the correcting data corresponding to the high and low (dark and light) gradation levels in each set of correcting data. Out of the correcting data which are to be designated by each of the gradation levels (reference density data), the correcting data corresponding to the voltage drop data indicative of larger voltage drops have larger values so as to satisfactorily correct the voltage drop in the power source voltage supplied to the printing head 16.

It is desirable that the correcting data are described in a number of bits approximately the same as the number of bits used to describe the gradation levels.

Figure 19:
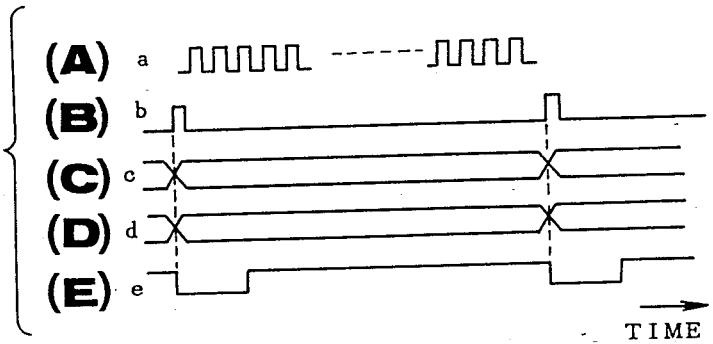

The counter 71 is supplied with a clock pulse signal a shown in FIG. 19(A) which is obtained by dividing the reference clock pulse signal from the terminal 22 shown in FIG. 15 through the terminal 32 and the data transfer pulse b shown in FIGS. 19(B) and 17B(A) which is obtained from the address counter 21 shown in FIG. 15 through the terminal 29. The counter 71 generates a comparison datum d shown in FIG. 19(D) which is successively incremented starting from "0", for example, every time the transfer pulse b is received. The comparison datum d is reset to "0" when the next transfer pulse b is received. This comparison datum d is inverted into an inverted comparison datum d' in the inverter 80 and is supplied to the comparator 73 which is also supplied with the correcting datum f from the ROM 72, and the comparator 73 compares the two data d' and f. The inverter 80 may be omitted by using a down-counter in place of the counter 71 which is an up-counter.

Figure 20:
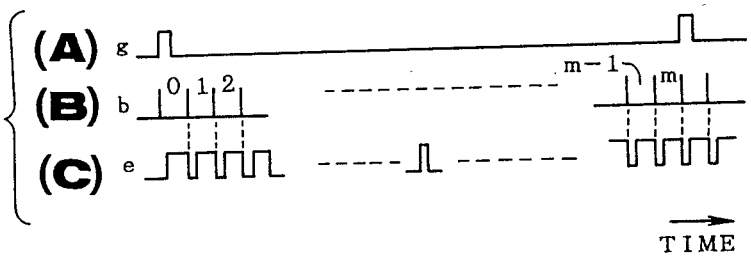

The comparator 73 compares the values of the correcting datum f and the inverted comparison datum d' for every period of the data transfer pulse b shown in FIGS. 19(B) and 20(B), and outputs the pulse signal e shown in FIGS. 19(E), 20(C) and 21(A). The pulse signal e has a high level when the value of the inverted comparison datum d' is smaller than the value of the correcting datum f, and has a low level when the value of the inverted comparison datum d' is greater than or equal to the value of the correcting datum f. Accordingly, the pulse width of the pulse signal e is proportional to the value of the correcting datum f read out from the ROM 72.

The AND circuit 74 is supplied with the pulse signal e from the comparator 73 and the output heating time limiting pulse of the data counter 25 obtained through the terminal 30. But since the heating time limiting pulse has a high level essentially for the entire duration of the printing of the dot, the pulse signal e is passed through the AND circuit 74 and is supplied to the gate circuits G1 through Gn through the terminal 40 as the corrected heating pulse.

Therefore, predetermined heating elements out of the heating elements R1 through Rn are applied with the current depending on the printing data for the applying time which changes depending on the printing density of the picture element data constituting the printing data. Every time the data counter 25 counts the maximum number m of gradation levels, the printing of one line on the recording sheet 14 is completed. When the printing of one line on the recording sheet 14 is completed, the start pulse signal g shown in FIG. 20(A) from the terminal 23 clears the data counter 25, and the data counter 25 again starts to count from "0" to "m−1".

FIGS. 22(A) and 22(B) are time charts for explaining the correction of the current applying duration according to the voltage drop datum. A percentage of the number of heating elements applied with the current with respect to the total number n of the heating elements R1 through Rn will hereunder be defined as a percentage of conducting heads for convenience' sake. FIG. 22(A) shows the correcting datum f readout from the ROM 72, and FIG. 22(B) shows the pulse signal e outputted from the AND circuit 74. In FIG. 22(B), a corrected pulse width of the pulse signal e for a low percentage of conducting heads (for example, 1%) is denoted by I, a corrected pulse width of the pulse signal e for an average percentage of conducting heads (for example, 50%) is denoted by II, and a corrected pulse width of the pulse signal e for a high percentage of conducting heads (for example, 100%) is denoted by III.

As may be seen from FIG. 22(B), the pulse width of the pulse signal e is corrected at a rising edge thereof so that the pulse width becomes large when the percentage of conducting heads is high and the voltage drop between the power source and the printing head 16 is large. Hence, it is possible to control the current applying duration to each of the heating elements of the printing head 16 so that the density of the actually printed dot is the same for each gradation level regardless of the voltage drop of the head terminal voltage $V_T$. On the other hand, the width of the pulse signal e is corrected so that the pulse width becomes small when the percentage of conducting heads is low and the voltage drop at the terminal of the printing head 16 is small. Accordingly, it is possible to control the current applying duration to each of the heating elements of the printing head 16 so that the heating elements will not be heated in excess and the density of the actually printed dot is the same for each gradation level regardless of the voltage drop caused to the supply voltage to the printing head 16.

According to the third embodiment of the voltage drop detecting circuit 42 shown in FIG. 14, the voltage drop of the head terminal voltage $V_T$ is detected in the vicinity of the end of the current applying duration for one gradation of each density data. Since the head terminal voltage $V_T$ is stable in the vicinity of the end of the current applying duration, the voltage drop data can be obtained with an even higher stability compared to the first and second embodiments of the voltage drop detecting circuit 42 described before.

The construction of the voltage drop detecting circuit 42 is not limited to those shown in FIGS. 4, 7 and 14, and any circuit which has the function of detecting the voltage drop caused to the supply voltage to the printing head 16 may be used for the voltage drop detecting circuit 42. In addition, the corrected current applying duration to the heating elements of the printing head 16 depending on the detected voltage drop is not limited to that shown in FIGS. 13(B) and 22(B) which are simply examples.

In the embodiments described heretofore, the voltage drop detecting circuit 42 detects the voltage drop caused to the supply voltage to the printing head 16 which is responsible mainly for the different mix of conducting heads due to the different printing data. However, the present invention is also applicable to the case where the power source voltage from the power source is unstable. In this case, the voltage drop detecting circuit 42 detects the instability of the power source as the voltage drop.

Further, the present invention is not limited to these embodiments, but various variations and modifications may be made without departing from the scope of the present invention.

What is claimed is:

1. A gradation control device for a thermal ink-transfer type printing apparatus, said printing apparatus comprising a power source and a thermal printing head coupled to said power source through a transmission path and provided with n heating elements arranged in line, said n heating elements heating an ink film coated with a kind of ink which melts due to heat and transferring the melted ink onto a recording sheet which makes contact with the ink film to print images line by line, said gradation control device comprising:

memory means for storing at least n digital data of natural binary code which represent gradation levels with which a printing is to be carried out;

control data producing means including comparing means repeatedly supplied with the n digital data from said memory means in response to a clock pulse signal having a constant repetition frequency m times in a time period in which one line is printed and means for generating a reference printing density datum a value of which is changed every time the n digital data are supplied to said comparing means once, said comparing means being supplied with said reference printing density datum so as to compare the n digital data with said reference printing density datum, said control data producing means producing control data in a form of a serial n-bit data signal having a constant bit rate in accordance with said constant repetition frequency every time the n digital data are supplied to said comparing means once, each control datum constituting the serial n-bit data signal having a logic value "1" or "0" depending on whether or not each value of the n digital data is greater than or equal to the value of said reference printing datum;

serial-to-parallel converting means for converting said n-bit data signal into a parallel n-bit data signal;

voltage drop detecting means for detecting a voltage drop caused in a supply voltage to said thermal printing head and for producing a voltage drop datum dependent on the detected voltage drop;

heating pulse generating means for generating m heating pulses for printing on line, said m heating pulses respectively having pulse widths which are variable as a function of the value of the reference printing density datum and said voltage drop datum; and driving means supplied with said parallel n-bit data signal and said heating pulses for supplying to each of said n heating elements having a corresponding control datum with the logic value "1" a current having a predetermined amplitude for current applying durations corresponding to the widths of the heating pulses, said voltage drop detecting means detecting the voltage drop in a vicinity of an end of each of said current applying durations.

2. A gradation control device as claimed in claim 1 in which said control data producing means comprises means for generating m heating time limiting pulses depending on said control data in a time period in which one line is printed, said heating time limiting pulses having a period equal to a time it takes to carry out a control with respect to the heating elements for one reference printing density datum, said heating pulse generating means comprising a memory which pre-stores a set of correcting data amounting to a maximum number m of gradation levels at addresses each designated by the voltage drop datum from said voltage drop detecting means and means for producing said heating pulses by correcting pulse widths of said heating time limiting pulses based on the correcting datum.

3. A gradation control device as claimed in claim 2 in which said memory of said heating pulse generating means pre-stores such correcting data that a change in the printing density among each of the gradation levels is approximately linear.

4. A gradation control device as claimed in claim 2 in which said memory of said heating pulse generating means pre-stores such correcting data that a change in the printing density among each of the gradation levels approximates a predetermined curve.

5. A gradation control device as claimed in claim 1 in which said voltage drop detecting means comprises a differential amplifier for amplifying a voltage difference between a constant reference voltage and said supply voltage at a terminal of said thermal printing head, and an analog-to-digital converter for converting an output of said differential amplifier into a digital signal which is outputted as said voltage drop datum based on a clock signal having a timing corresponding to the vicinity of the end of each of said current applying durations.

6. A gradation control device as claimed in claim 5 in which said voltage drop detecting means further comprises delay means connected to said analog-to-digital converter for delaying said clock signal so as to cause said analog-to-digital converter starting to output said voltage drop datum before said end of each of said current applying durations by supplying said clock signal to said analog-to-digital converter prior to a timing of said end of each of said current applying durations.

* * * * *